Oct. 25, 1960

E. A. WAHL 2,957,608

POWDER FEEDER

Filed April 8, 1958

Inventor:
Eugene A. Wahl
By Rudolph J. Gurick
Attorney

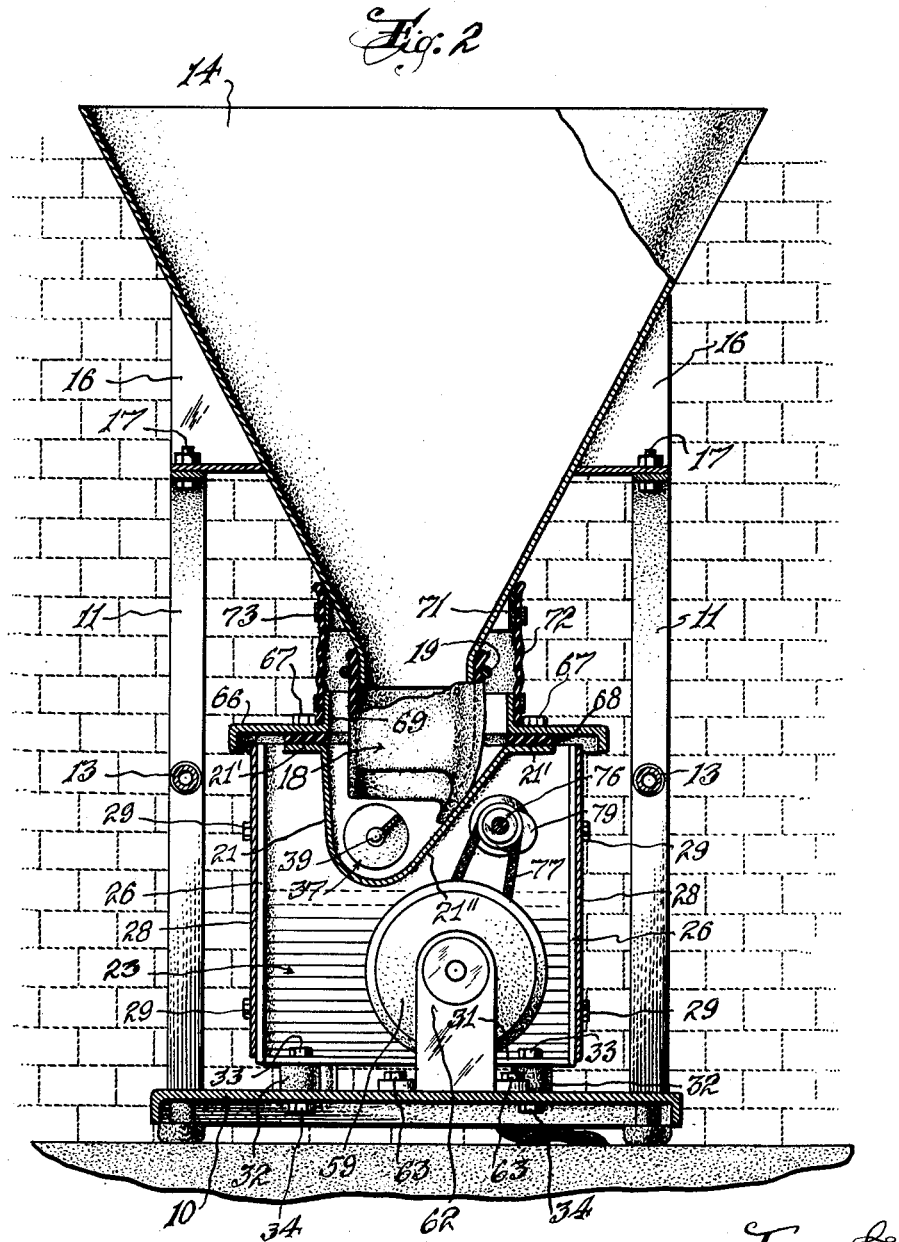

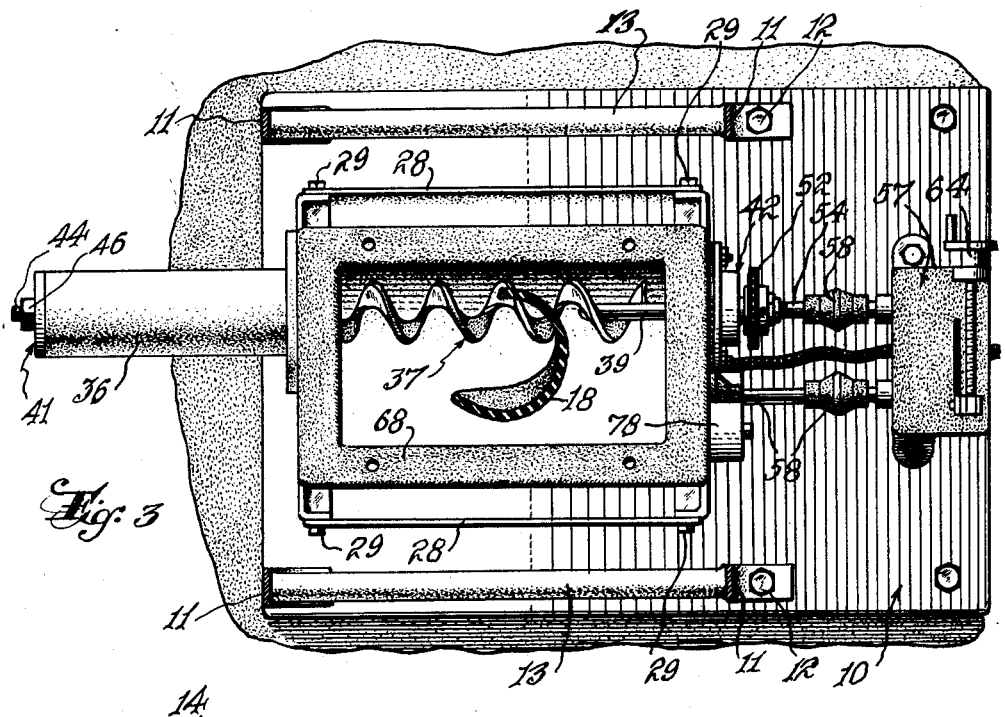

United States Patent Office 2,957,608
Patented Oct. 25, 1960

2,957,608

POWDER FEEDER

Eugene A. Wahl, 294 Forest Ave., Glen Ridge, N.J.

Filed Apr. 8, 1958, Ser. No. 727,195

6 Claims. (Cl. 222—161)

This invention relates to automatic powder feeding apparatus, and more particularly to apparatus for continuously feeding powdered or granular materials at a predetermined volumetric rate.

Powder feeders are employed to discharge measured amounts of powder, or the like, into a container or medium as, for example, chemicals into a stream of water for purification and treatment.

The feeder of my invention is of the volumetric type, wherein the material handled is metered by volume. In general, volumetric feeders include a screw, rotary pocket wheels, grooved discs, or the like, which displace a certain volume of material as the displacing element is moved, or rotated. Volumetric feeders require that the material fall into the measuring or displacing element, and out again. The completeness with which the measuring element fills and empties governs the accuracy of the feeder.

Various volumetric powder-feeding arrangements have been proposed heretofore. Such prior art apparatus and machines, however, are not capable of uniform, accurate, operation with powdered materials of widely different flow characteristics such as, for example, free flowing granular dry powders and sticky amorphous powders. Many substances will not flow into the measuring element due to bridging, or will not flow out due to sticking. The operating inaccuracy of prior art volumetric-type feeders, under optimum conditions is about 5 percent, and under actual conditions commonly encountered in practice may reach 15 percent.

An important feature of my invention resides in a novel arrangement wherein material from a storage hopper, or the like, is fed to a trough having a discharge, or dispensing, tube extending therefrom. A screw, or auger, extends from the trough into the dispensing tube, and rotates at a predetermined constant speed. The tube, trough, and auger are simultaneously vibrated transversely of the auger by suitable means. Under the simultaneous action of auger rotation and transverse vibration, powder is discharged from an open end of the tube at a predetermined volumetric rate, at an operating accuracy and reliability factor far exceeding that possible with existing apparatus.

With prior art volumetric-type feeders, materials having varying bulk densities due to aeration cannot be fed accurately since, for example, less material is discharged from the feeder when the material contains an excess of air than when the material contains a normal, or lesser, amount of air. With the feeder of my invention, the material is subjected to controlled vibration for a definite period of time before it flows into and through the screw and dispensing tube. Density variations due to aeration are thereby eliminated by the vibration prior to metering, with the result that the material is accurately metered.

Another important feature of my invention resides in a sleeve of resilient material which fastens to the discharge end of the storage hopper over the rotating auger. The lower edge of the sleeve extends some distance below the trough cover to a plane some variable distance above the screw. The material within the trough is thereby maintained at a level below the top of the trough, and is therefore loose, with freedom of motion between particles.

The sleeve may be raised or lowered to accommodate the individual handling characteristics of different materials. In general, free flowing materials handle best with the sleeve set lower down toward the screw, while non-free flowing substances may require a somewhat higher setting of the sleeve.

The resilient composition of the sleeve permits setting it so low as to contact the trough, and also to transmit vibration from the trough to the material in the lower region of the hopper.

If the amount of vibration of the hopper is not sufficiently great to prevent bridging and sticking in the hopper with the above arrangement I provide a novel adjustable connector between the hopper and vibrating cover on the trough whereby additional, adjustable, greater vibratory movement may be imparted to the hopper.

Volumetric feeders of the auger type are generally subject to severe damage when hard material, such as gravel, or the like is fed therethrough, since pieces of the material often wedge between the auger and discharge tube or trough causing damage to the auger, or other machine components. With the feeder of my invention, a clearance equal to or greater than the size of the largest particles of the material being handled, may be maintained between the auger and dispensing tube and trough. No damaging, wedging, or jamming, of the material is possible, and since the vibration of the apparatus is transverse to the direction of flow of the material through the auger, the feed rate is unaffected by such vibration.

To insure a powder feeder which is capable of continuous, trouble-free, operation, I provide a novel bearing sealing arrangement at the drive end of the auger. By using a conventional sealed ball bearing in conjunction with my novel sealing arrangement, a double seal is provided at this point to prevent material in the trough from entering the bearing. The sealing arrangement, which comprises another important feature of my invention, comprises a plane, flexible, sealing member having an opening therein. The seal is positioned between the ball bearing and the end of the trough. The edge of the opening in the seal contacts a sleeve which mounts on the extending shaft of the auger. Since the outside diameter of the sleeve is slightly greater than the diameter of the opening in the flexible sealing member, an effective seal is created thereat.

An object of this invention is the provision of a powder feeder of simple, rugged, design and of extreme accuracy.

An object of this invention is the provision of a powder feeder which combines the action of a rotating auger with mechanical vibrations transversely thereof, to dispense powdered materials at a predetermined volumetric rate.

An object of this invention is the provision of a cylindrical-shaped sleeve for use at the discharge end of a supply hopper for supplying granular material to a powder feeder mechanism of the rotating auger type, which sleeve controls the level of material in the trough, preventing the trough from filling completely and possibly packing, whereafter relative motion between particles would no longer be possible.

An object of this invention is the provision of a bearing sealing arrangement to prevent the granular material being handled by a powder feeder from entering the bearing and damaging the same.

An object of this invention is the provision of an adjustable arm member having a resilient portion therein for the transmission of vibrations from a normally vibrated powder feeding mechanism to the storage hopper supplying material to the said feeding mechanism.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

Figure 2 is a view taken substantially on line 2—2 of Figure 1;

Figure 3 is a view taken substantially on line 3—3 of Figure 1;

Figure 4 is an enlarged fragmentary sectional view of a bearing sealing arrangement; and Figure 5 is a fragmentary view of the powder feeder with an adjustable arm thereon for transmitting a desired amount of vibratory motion to the hopper.

Figure 1:
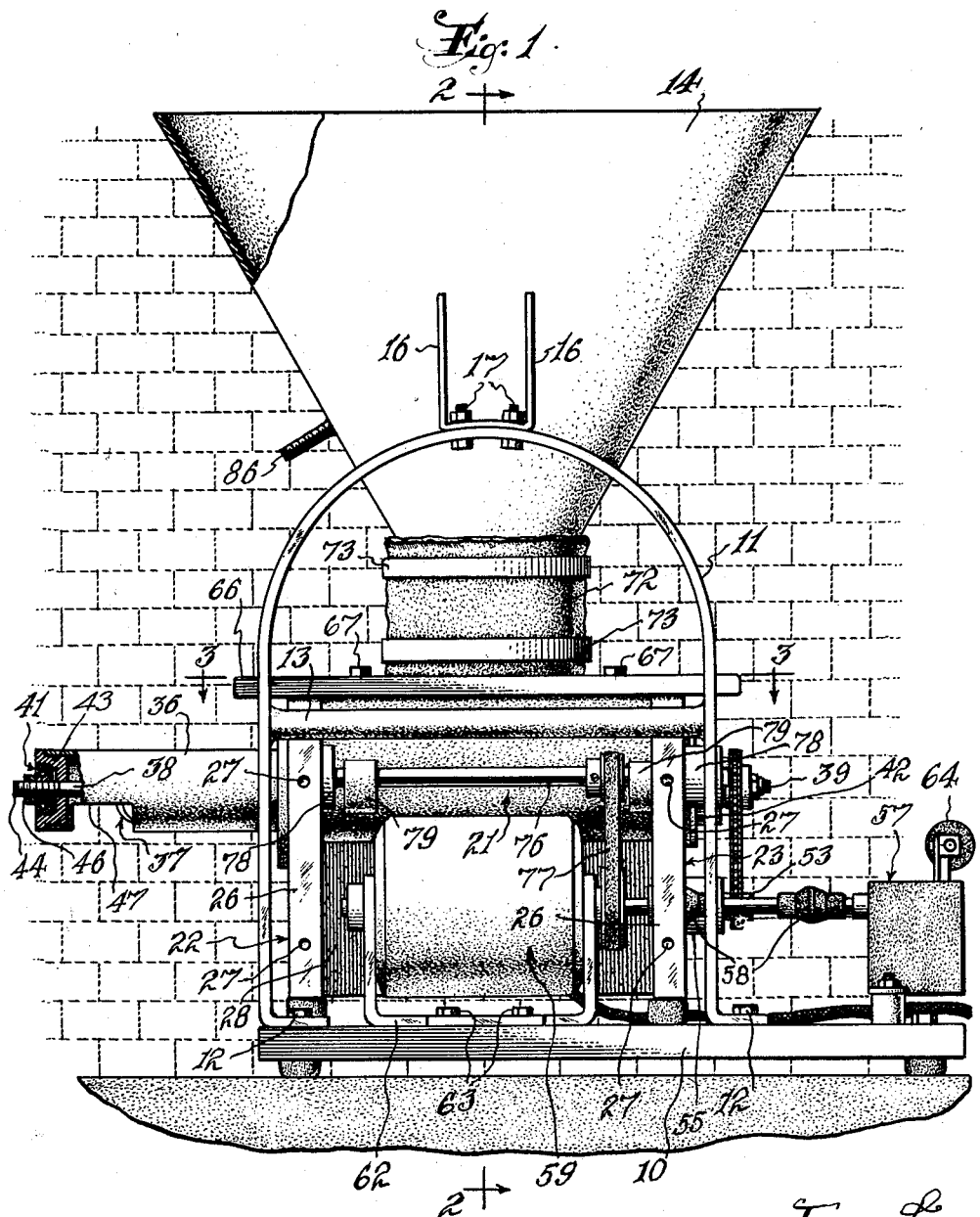
Figure 1 is a side elevational view of the powder feeder, with portions broken away for clarity.

Reference is first made to Figures 1–3 of the drawings, wherein the powder feeder of my invention is shown comprising a rigid base 10 to which are secured a pair of upwardly extending, inverted U-shaped brackets 11, 11, as by bolts 12. Tubular reenforcing members 13, 13 extend between the parallel leg portions of the U-shaped brackets. A cone-shaped hopper 14, having attaching brackets 16, 16 welded, or otherwise suitably secured thereto, is removably carried by the upwardly extending brackets as by means of bolts 17, 17 extending through holes in the U-shaped and attaching brackets 11, 11 and 16, 16 respectively. A resilient cylindrical-shaped sleeve 18, is secured to the lower end of the hopper 14 by a suitable metal fastening band 19 encircling the sleeve. The lower, free, end of the sleeve constitutes a discharge opening through which powder, or the like, from the hopper 14 is fed to a trough 21.

It will here be noted that although powder is mentioned as being handled, the apparatus is adapted to handle materials in powder, pellet or flake form. Typical of the items which are easily handled by the apparatus of my invention are: cement, salt, alum, sulphur, titanium oxide, stearate salts, anhydrous lime, wood flour, soda ash, clays, phosphate rock, pigments, dyes, zinc oxide, copper oxide, powdered metals, gravel, gelatin, carbon black, etc.

The trough 21 is secured by suitable means, such as by welding, between vertically-oriented front and rear end plates, or walls 22 and 23, respectively, a portion of which form front and rear walls of the trough. The vertical edges of the end plates 22 and 23 are provided with integral flanges 26 having tapped holes 27 therein whereby cover plates 28, 28 may be secured therebetween by bolts 29 threadedly engaging the tapped holes in the flanges. The lower horizontal edge of each of the end plates 23 and 24 are provided with integral flanges 21 to which resilient mounts 32 are secured by bolts 33. The resilient mounts 32 are secured to the base 10 by bolts 34.

A discharge, or dispensing, tube 36 is secured, as by welding, to the front end plate 22 and communicates with the trough 21 through a suitable aperture (not shown) in the end plate 22. An auger 37 extends through the trough 21 and tube 36, said auger being provided with front and rear end shafts 38 and 39 which extend through ball bearings 41 and 42, respectively. As seen in Figure 1, the outer race of the front bearing 41 is mounted within a well in an end cap 43 which closes the front of the dispensing tube 36. Threads 44 are provided on the shaft 38, and a nut 46 is threaded thereon, which nut abuts the inner race of the ball bearing. Tightening of the nut 46 on the shaft 38 places the auger 37 in tension since the rear end shaft 39 is fixed axially of the rear bearing. Powder discharges from the hopper into the trough 21, enters and moves along the dispensing tube 36 upon rotation of the auger, and subsequently discharges through a cut-out portion 47 formed in the lower wall of the dispensing tube adjacent the front end thereof.

The rear end shaft 39 of the auger 37 has a sprocket wheel 48 secured thereto by a set screw 49 and nut 51, as seen in Figure 4. A chain 52, as best seen in Figures 1 and 3, connects the sprocket wheel 48 on the rear end shaft 39 of the auger 37 with a sprocket wheel 53 on a shaft 54, which shaft is rotatably supported at one end thereof by a bearing 55 attached to the rear end wall 23. The shaft 54 is coupled to the output drive shaft 56 of a variable speed reduction unit 57 through a flexible coupling member 58. The speed reduction unit, in turn, is driven by a synchronous electric motor 59 connected thereto through a pair of flexible coupling members 58. The motor 59 is attached to a U-shaped motor mounting bracket 62 which is secured to the base plate 10 by bolts 63. The rate at which the auger is driven by the motor is adjustable within a wide range through rotation of the control handle 64 on the speed reduction unit.

A cover 66 is secured by bolts 67, to the horizontal flanges, designated 21', of the trough 21, with a gasket 68 therebetween to provide a tight seal between the cover and trough. An upwardly extending cylindrical flange 69 is attached to the cover adjacent an aperture therein, through which flange and aperture the sleeve 18 extends. A cylindrical shaped flange 71 of the same size as the flange 69 is attached to the cone-shaped hopper. The flanges 69 and 71 provide supporting means for a flexible sleeve 72 extending therebetween and secured thereto by suitable fastening bands 73, 73. By enclosing the trough, no objectional dust from the material being vibrated within the trough escapes to the atmosphere during normal operation of the powder feeder.

The end wall members 22 and 23, with the trough 21, auger 37, dispensing tube 36, and other components rigidly attached thereto, form an assembly that is flexibly mounted on the base 10 through the resilient mountings 32. The flexible connecting sleeve 72 connects the cover of this assembly to the supply hopper 14. During operation, this assembly, as a unit, is subjected to controlled vibrations, while the auger 37 is rotated. Vibration of the assembly is produced by the motor 59 which drives a shaft 76 through a belt 77 and suitable pulleys attached to the motor shaft and shaft 76. This shaft 76 is rotatably supported in sealed ball bearings 78, 78 suitably attached to the front and rear end walls 22 and 23. Eccentrics, or weights 79, 79 are suitably attached (by usual set screws of other suitable means not shown) to the shaft 76 adjacent the bearings 78. The center of mass of the weights is displaced from the shaft axis whereby rotation of the shaft by the motor produces transverse vibration of the above-mentioned trough, screw, and dispensing tube assembly. The material in the trough is thereby subjected to controlled vibration for a period of time before flowing into and through the auger.

It will be noted that the shaft 76 extends in a direction substantially parallel to the auger axis. Further, the shaft 76 lies in a horizontal plane which is adjacent the horizontal plane through the auger axis. The purpose of locating and orienting the shaft 76 is the above manner is to insure transverse vibration of the screw and trough assembly upon rotation of the vibration-producing eccentrics 79, 79 with the shaft 76. It will be noted that one wall 21" of the trough 21 is inclined at a substantial angle from a vertical position. With transverse vibration of the trough, material therein is periodically subjected to an upwardly directed velocity component by the inclined trough wall 21". It will be noted, however, that the material is always vibrated in a direction at right angles to, or transversely of, the auger axis. The transverse vibrations do not effect movement of the material axially of the auger. Thus, the actual volumetric rate at which the material is discharged from the dispensing tube depends upon the size and design of the auger flutes and the speed of auger rotation, both of which factors are readily controlled.

The performance of prior art powder feeder arrangements, particularly in the handling of gravel, or the like is generally unreliable and inaccurate. Without controlled vibration of the trough and auger assembly, such as is provided in my novel powder feeder, inaccuracies up to 50 percent are common. Further, with prior art arrangements, the larger particles of the gravel material become wedged between the auger and trough or dispensing tube thereby damaging the equipment and necessitating a shut-down thereof. The performance of my novel apparatus, on the other hand, is both reliable and accurate. Accuracy is insured by the use of the novel vibratory arrangement of my invention. Reliability of performance is insured by providing ample clearance between the auger and trough and dispensing tube. By making the above clearances at least as great as the size of the largest particle of the material handled, the particles will not become wedged in the feed mechanism. By way of example, if gravel having a maximum dimension of one-half inch is to be handled, the machine dimensions are chosen to provide at least one-half inch clearance between the auger flutes and the trough and dispensing tube. Since the vibrations produced by the rotating eccentrics 79, 79 are normal, or transverse, to the direction of movement of the material by the auger, such vibrations function to control the density of the material without effecting the forward movement thereof in the direction of the auger. Thus, it will be seen, that the vibration producing mechanism does not directly control, or effect the feed rate, except through the control of the density of the material before the material is metered. For this reason, any desired or necessary degree of clearance may be maintained between the auger, trough, and dispensing tube, without effecting the feed rate.

Since high accuracy is dependent upon density control which, in turn, is dependent upon the vibration of the material before it is metered, it is necessary that the material in the trough be in condition to respond to the vibrating action of the apparatus. Vigorous vibration of the material in the trough is insured by maintaining the level of material therein less than full. This provides for unfaltering flow into the auger, to re-fill the auger as fast as it displaces material out through the discharge port.

It will be understood that the resilient mountings 32 are not one-hundred percent effective in isolating the vibrating trough and auger assembly from the base 10, and in practice, are only about 75 percent efficient. For this reason, the hopper is subjected to some vibration from the vibrating assembly through the base 10 and brackets 11, 11 and 16, 16 which aids in the flow of material in the hopper. The sloped floor of the trough, under vibration, transmits these vibrations through the material in the trough up into the hopper outlet, thereby providing an unusual degree of insurance against sticking and bridging of material across the hopper outlet.

If the material being handled is of a particularly sticky nature, and does not respond sufficiently to the vibration of the hopper provided through the sleeve 18 and the brackets 11, 11, I provide a novel adjustable connecting link between the hopper 14 and the vibrating trough cover 66. Reference is made to Figure 5 of the drawings, wherein the connecting device, designated 82, is shown attached to the hopper 14 of the powder feeder of my invention, a portion of the device being shown broken away for clarity. The device includes a generally L-shaped arm 83 secured by nuts 84 to a threaded stud 86 extending from the hopper 14. The lower, horizontal, portion of the arm is provided with a threaded aperture within which is threadedly secured an adjustable rod 87, having a lock nut 88. A circular disc 89, having a downwardly extending cylindrical flange 91, is suitably secured, as by welding, to the lower end of the rod 87, and a resilient block 92 is attached thereto, which block engages the vibrating trough cover 66. It will be apparent that the pressure with which the block 92 contacts the vibrating cover is adjustable by raising or lowering the threaded rod 87 in the threaded bracket 83. In this manner, the hopper is controllably vibrated. It will here be noted that, generally, for proper functioning of the powder feeder, the hopper must be vibrated to a lesser degree than the trough, since greater vibration of the hopper could result in excessive compacting of the material in the hopper. The primary purpose of vibrating the hopper is to insure that the material flows into the trough and, ordinarily, under most conditions, the hopper will be vibrated sufficiently through the sleeve 18 and brackets 11, 11 without the need for the connecting device 82, the connecting device 82 being used only for extremely sticky material.

Long, trouble free, operating life on the powder feeder depends upon how well the bearings for the rotating members are protected from dust, dirt and erosion. At the drive end of the auger 37, I provide a novel sealing arrangement for the protection of the bearing 42. The sealing arrangement for the bearing 42 is of a design permitting ready interchangeability of augers. Reference is again made to Figure 4 wherein there is shown an enlarged sectional view of the sealing arrangement as applied to the bearing 42. The bearing 42 is of the conventional sealed ball bearing type having a flat, radial mounting flange 96 formed thereon. A plane, flexible, sealing member 97, made of rubber, plastic, or other suitable material, is mounted between the end wall 23 and the bearing flange 96. Bolt and nut fastening devices 98 secure the bearing and sealing member to the outer surface of the wall 23. The rear end shaft 39 of the auger 37 is provided with a reduced diameter end portion whereby a shoulder 99 is formed thereon. A metal sleeve 101 is set-screwed within the inner bearing race, extending from a distance within the trough, through the bearing, and terminating flush with the bearing race outside the trough, abutting sprocket wheel 48. Auger shaft shoulder 99 abuts sleeve 101, while reduced shaft diameter extends through sleeve 101, through bore of sprocket 48, and through lock nut 51.

In assembling sleeve 101 and sealing member 97, sleeve 101 is inserted from right to left in Figure 4 through bearing inner race and through sealing member 97. Since member 97 has a smaller hole than the diameter of sleeve 101, the latter bulges sealing member in the direction of sleeve insertion, i.e., right to left, as shown in Figure 4. This bulged condition of the sealing member provides a tight seal against sleeve 101, with minimum rotational drag on 101.

Sleeve 101 remains permanently set-screwed into rear bearing and is not removed with the auger.

Since the volumetric rate of powder fed out of the apparatus is related to the size and design of the auger flutes, it is desirable to provide a simple arrangement whereby different size augers can be attached to the apparatus for specific ranges of feed rate. With the sealing arrangement shown in Figure 4, the augers are quickly and easily interchanged. To remove the auger 37 from the apparatus, the sprocket wheel 48 is removed from the end shaft 39 after first removing the nut 51 and loosening the set screw 49. The auger, with the end cover 43 and front bearing 41 attached thereto is removable through the front of the dispensing tube 36, as seen in Figure 1. The front bearing 41 and end wall 43 are removed from the front end shaft 38 of the auger upon removal of the nut 44 from the shaft.

In placing an auger in the machine, the auger is inserted through the dispensing tube 36, and the rear end shaft inserted through sleeve 101 and sprocket 48. Nut 51 is then tightened, clamping the sleeve and sprocket wheel between the nut and shoulder 99. Sprocket wheel 48 is then secured by set screw 49 to the auger shaft. The end member 43 and front end bearing 41 are then placed on the front end shaft, and the nut 46 threaded thereon. (See Figure 1.) By tightening the nut 46, the auger 37 is placed under tension between the front and rear bearings 41 and 42.

Those familiar with present powder feeders and their limitations respecting accuracy and reliability of operation and their use restriction to specific materials will recognize the numerous advantages in a machine made in accordance with this invention. My machine is of simple, rugged construction promoting long trouble-free operating life. The controlled transverse vibration of the trough and auger assembly assures a metered flow of powdered or granular material into, through, and out of the auger.

Having now described my invention in detail, in accordance with the requirements of the patent statutes, various changes and modifications will suggest themselves to those skilled in this art, and it is intended that such changes and modifications shall fall within the spirit and scope of the invention as recited in the following claims.

I claim:

1. Apparatus for dispensing granular material, or the like, at a predetermined rate comprising, a trough having a dispensing tube extending therefrom, an auger disposed in said trough and extending into the dispensing tube, means rotating the auger about its axis to advance the material from the trough through the dispensing tube, and means vibrating the trough, dispensing tube, and auger assembly in a direction predominantly normal to the auger axis.

2. The invention as recited in claim 1 wherein the clearance between the auger and the inner wall of the dispensing tube is at least as great as the maximum size of the particle of material dispensed.

3. The invention as recited in claim 1, including a storage hopper having a discharge opening disposed over the auger intermediate the ends of the trough, and a resilient sleeve having an outer end secured to the discharge end of the hopper and an inner end extending into the trough and in sliding engagement with a wall of the trough, said inner end of the sleeve including a cut out portion to clear the auger.

4. Apparatus for dispensing granular material, or the like, at a predetermined rate comprising, a trough having an inclined side wall, a dispensing tube secured at one end of the trough and extending therefrom, an auger disposed in said trough and extending into the dispensing tube, the radial clearance between the auger and dispensing tube being at least as great as the maximum size of the particle of material to be dispensed, means rotating the auger about its axis to advance the material from the trough through the dispensing tube, and means vibrating the trough, dispensing tube, and auger in a direction transversely of the auger axis, the vibrating inclined side wall of the trough imparting an upward component of velocity to the material in the trough, normal to the auger axis.

5. The invention as recited in claim 4, including a storage hopper having a discharge opening disposed over the auger intermediate the ends of the trough, a resilient sleeve having an outer end secured to the discharge end of the hopper and an inner end extending into the trough and in sliding engagement with the inclined wall of the trough, said inner end of the sleeve including a cutout portion to clear the auger.

6. Apparatus for dispensing granular material, or the like, at a predetermined rate comprising, a trough having a dispensing tube; an auger disposed in said trough and extending into the dispensing tube; means rotating the auger about its axis to advance the material from the trough through the dispensing tube; means vibrating the trough, dispensing tube and auger assembly in a direction predominantly normal to the auger axis; a hopper having a discharge opening disposed over the auger intermediate the ends of the trough; a trough cover secured to the trough and provided with an opening permitting the flow of material from the hopper into the trough; a bracket secured to the hopper; and a resilient block secured to the bracket, said resilient block being adjustably positioned on the said bracket and movable into engagement with the said trough cover for transmisison of vibrations from said trough to the hopper through the trough cover, resilient block and bracket.

References Cited in the file of this patent

UNITED STATES PATENTS

| 1,191,137 | Powers | July 11, 1916 |
| 1,423,698 | Thurston | July 25, 1922 |
| 2,560,480 | Rogers et al. | July 10, 1951 |
| 2,800,252 | Wahl | July 23, 1957 |

FOREIGN PATENTS

| 126,891 | Australia | Feb. 20, 1948 |